United States Patent [19]
England

[11] 3,862,768
[45] Jan. 28, 1975

[54] ROLLABLE FULCRUM BALANCING BOARD RECREATIONAL AND EXERCISE DEVICE PROVIDED WITH NON-LINEAR STABILIZATION FEATURES

[76] Inventor: Will Clarke England, 1710 Eastcrest Dr., Austin, Tex. 98952

[22] Filed: Oct. 26, 1970

[21] Appl. No.: 83,763

[52] U.S. Cl......... 280/205, 272/57 A, 280/87.04 A, 272/60
[51] Int. Cl............................................. B62k 1/00
[58] Field of Search...... 272/1 R, 57 R, 57 A, 57 D, 272/60, 33 A; 280/87.04 A, 205

[56] References Cited
UNITED STATES PATENTS
3,306,626 2/1967 Kawada ............................ 280/205
3,604,726 9/1971 Tracy................................. 280/205

FOREIGN PATENTS OR APPLICATIONS
659,280 10/1951 Great Britain...................... 272/57E
985,069 3/1965 Great Britain...................... 272/33A Primary Examiner—Richard C. Pinkham
Assistant Examiner—R. T. Stouffer
Attorney, Agent, or Firm—Marion E. Shafer

[57] ABSTRACT

A balancing board recreational device in which a rollable fulcrum is confined within a cavity formed by a protuberant center portion occupying about two-thirds of the length of said balancing board being constructed to resemble a sombrero hat and adapted to balance and ride on a spherically-shaped fulcrum.

5 Claims, 6 Drawing Figures

PATENTED JAN 28 1975　　　　　　　　　3,862,768

WILL CLARKE ENGLAND
INVENTOR.
BY Marion E. Shafer
ATTORNEY

ROLLABLE FULCRUM BALANCING BOARD RECREATIONAL AND EXERCISE DEVICE PROVIDED WITH NON-LINEAR STABILIZATION FEATURES

SUBJECT MATTER OF THE INVENTION

The invention relates generally to balancing type recreational devices and relates more specifically to circular teeter-totter type balancing recreational devices in which the fulcrum for such device is a rolling body.

OBJECTS OF THE INVENTION

Among the more popular of the skill testing and balancing recreational devices of the past decade has been the skate board and the teeter-totter board version of a balancing board and log device. Although the teeter-totter board and log involved primarily lateral balancing movement the flat balancing board on a log involved rapid and violent movement as the log approached either end of the flat balancing board with the result that very frequently the log fulcrum spun completely out from under the balancing board at one end or the other usually producing a violet spill in which the rider was exposed to dangers of spinal column and head injuries. Great skill was required to operate the device without incurring the dangers of serious bodily injury. It is therefore an object of this invention to provide an analagous type of balancing recreational device in which the more violent motions of the device will be slowed by reactive forces invoked in the structure involved.

Another object of the invention is to provide a balancing recreational device in which the rollable fulcrum will be confined within a cavity in the under surface of the balancing board.

Another object of the invention is to provide a structure in balancing board recreational devices that will slow down the violent motion of the balancing board as any extremity of the balancing board approaches the rollable fulcrum.

A further object of the invention is to provide a circular balancing board operated on a spherically shaped fulcrum such that a balancing board can be moved and balanced in all directions while at the same time still limiting the violent extremes of motion.

Still another object of the invention is to provide a self centering balancing board that will tend to return to a center neutral balanced position when the operator pauses.

A further object of the invention is to create a balancing board device with which the rider can experiment with balancing forward and back motion and elliptical or orbital motion in addition to side oscillating motion that characterized log and balancing board devices.

A still further object of the invention is to provide said balancing board recreational device with a footing trough that will reduce the dangers of the operator slipping off of the edge of the balancing board.

A still further object of the invention is to provide a secondary circular footing trough within the circumference of an outer footing trough so that both adults and children may operate a single size of the hat-shaped version of said balancing board.

A still further object of the invention is to create a recreational device that provides most if not all of the sensational breath-taking thrills of a skill manipulated balancing device without completely terrorizing new or inexperienced users of the device or parents of children learning to use the balancing board.

Other objects and advantages of this invention will become apparent through consideration of the following description and appended claims in conjunction with the attached drawings in which:

Figure 1:
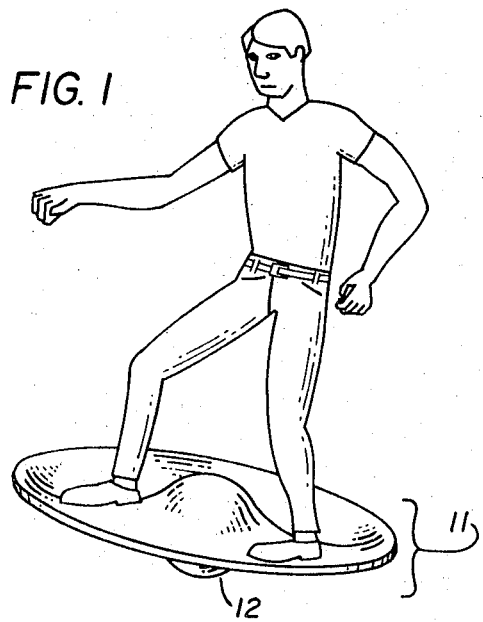
FIG. 1 is a perspective view of a rider operating a ball and hat version of the invention described herein in which a non-linear balancing disc is balanced on a spherical fulcrum.

In describing one selected form of preferred embodiment of this invention as shown in the drawings and this specification, specific terms and components are used for clarity. However, it is not intended to limit the claimed invention to the specific form, components, or construction shown and it is to be understood that specific terms used in this illustration of the invention are intended to include all technical equivalents which operate in a similar manner to accomplish a similar purpose.

DETAILED DESCRIPTION OF PREFERRED EMBODIMENT OF INVENTION

Referring to specific embodiments of the invention selected for illustration in the accompanying drawings, the rollable fulcrum balancing recreational device as illustrated in FIG. 1 is designated generally or as a whole by the number 11.

Teeter-totter boards designed to ride on and be balanced on so-called cylindrically shaped logs have existed for some time in the recreational art together with a handful of minor refinements; but in each of the previous instances the balancing board has been provided with a straight or flat bearing surface which this inventor chooses to refer to as a linear bearing surface since any part of the undersurface of said balancing board can be rolled over the fulcruming log or roller with equal ease. In the improved balancing recreational device contemplated by this invention the inventor has chosen to call or define the concave balancing board 11 a non-linear balancing board because the arc-shaped bearing surface on the under portion of said balancing board presents a long arc curve for contact with and to be balanced on a sphere shaped rolling fulcrum 12 with the result that the resulting interaction between fulcruming roller 12 and non-linear balancing board 11 will be non-linear or nonuniform depending upon what portion of said long arc bearing surface on the underside of balancing board 11 is in contact with roller 12 at the particular moment.

In this embodiment of the invention the inventor has fabricated a generally circular or distorted disc shaped balancing board 11 having an exterior or upper surface appearance approximating that of a large sombrero hat alalagous to the sombreros used in Mexican hat dances- which is designed to ride on and be balanced on a generally sphere shaped rolling fulcrum 12. The inventor conceives of and describes his non-linear disc shaped balancing board balanced on a ball shaped fulcrum 12 as analagous to or related to the Mexican hat dances in which the dancers dance into and out of the large brim of a Mexican sombrero and he refers to the device as a "hat and ball balancing board."

Figure 2:
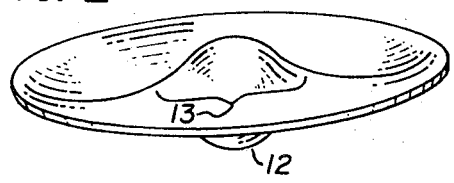
FIG. 2 is a detailed perspective view of the same version of the invention illustrated in FIG. 4 with the hat-shaped balancing board tilted towards the viewer.

The general exterior appearance of the disc or hat shaped balancing board 11 is illustrated in perspective views of the upper surface of said balancing board 11 in FIG. 1 and FIG. 2 of the drawings. The diameter of the disc or hat shaped balancing board 11 should roughly approximate the distance from the floor to the waist of the person for whom the balancing board is devised or selected with the crown of the hat or the protuberant center portion 13 occupying about half to two-thirds of the diameter of said hat shaped balancing board. At the outer circumference of said hat shaped balancing board 11 there is provided an upturned periphery area 14 resembling the brim of a Mexican sombrero hat with the area between the crown 13 of the hat and said upturned periphery brim area 14 forming an annular foot positioning trough or trench 15 in which the rider may stand as illustrated in FIG. 1 of the drawings.

The undersurface 16 of hat shaped balancing board 11, under the protuberant center 13 or crown of said hat shaped balancing board forms a long arc concave circular cavity with sides gently sloping away from the central apex of said concave enclosure to define a generally concave dome shaped bearing surface enclosure within which sphere shaped fulcrum ball 12 is confined and forms the limited shiftable bearing surface by means of which said hat shaped balancing board 11 is caused to ride on and be balanced on generally sphere shaped rolling fulcrum 12.

Figure 3:
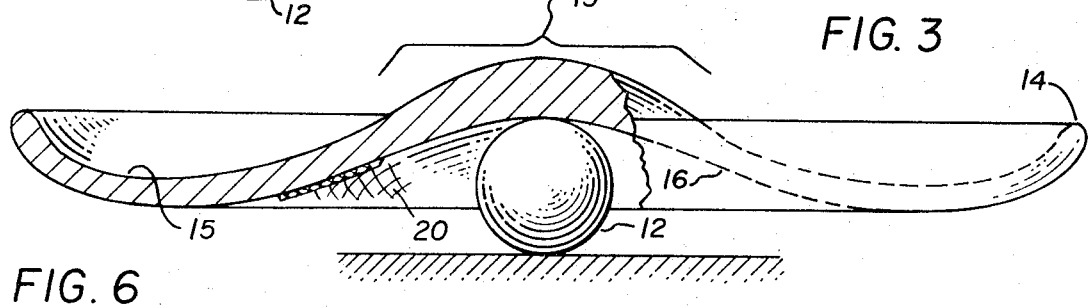
FIG. 3 is a horizontal section view of the basic ball and hat version of the invention showing the spherical fulcrum in position under the crown of said hat-shaped balancing board.

By examining FIG. 1, and FIG. 3 of the drawings the reader will be able to observe that hat-shaped balancing board 11 with its protuberant center portion 13 is fairly easily balanced when the apex of the long arc forming the undersurface 16 of said balancing board is resting on sphere shaped rolling fulcrum 12 since this is a natural balanced or neutral center position. But it can also be observed that if a rider on said non-linear hat-shaped balancing board 11, positioned as illustrated in FIG. 1 of the drawings, shifted his body weight back and forth laterally — toward alternate sides of the device — that non-linear balancing board 11 can be made to oscillate back and forth while still preserving its balanced position on rollable fulcrum 12. But it should also be noted that it takes progressively increasing vigorous or violent motions on the part of the rider to cause the gently sloping long arc concave undersurface 16 of protuberant center portion 13 of said non-linear balancing board 11 to ride up on sphere shaped rolling fulcrum 12 as the edge of said balancing board 11 approaches the rollable fulcrum. In fact the special shape of non-linear balancing board 11 makes it almost impossible for the rider to apply enough force to cause fulcrum 12 to spin out from under non-linear balancing board 11 and the inventor has chosen to define or to describe the increased resistance or increased reactive forces invoked as the edge of said non-linear balancing board 11 climbs up on sphere 12 as a non-linear stabilization feature or as non-linear motion slowing features.

It should be pointed out that the use of a spherical or ball shaped fulcrum 12 and a concave dome shaped bearing undersurface 16 under hat shaped balancing board 11 permits an omni-directional interaction between the balancing board and the rollable fulcrum. This permits elliptical or orbital balancing patterns in addition to the back and forth oscillating motion that was possible with previous teeter-totter balancing boards.

In the prototype constructed for testing the device, the inventor employed a series of 4 inch, 6 inch, 8 inch, and 10 inch wooden balls for fulcruming sphere 12. Employment of a rigid wooden ball analagous to a bowling ball made for somewhat fast action and substituting balls of different size was utilized as a means of slowing the motion or action of the balancing board hat relative to spherically shaped fulcrum 12. The relative "action" between the curved bearing undersurface of the hat shaped balancing board and fulcrum ball 12 is retarded or slowed in part by the special shape of said concave dome shaped undersurface 16 of said hat shaped balancing board 11 and is slowed or controlled in part by the ratio of the radii of curvature of said concave under surface 16 to the radius of sphere shaped fulcrum ball 12. By experimentation the inventor has found that the preferred range of radii of curvature of the concave under surface 16 of the center portion of said hat shaped balancing board 11 should have a range of four to one to ten to one times the radius of the shaped fulcruming sphere 12 on which said hat shaped balancing board rides.

The magnitude of the reactive or motion slowing forces may be adjusted to meet the requirements of the designer by altering the radii of curvature of concave bearing undersurface of balancing board 16 to the radius of rolling fulcrum 12.

Figure 6:
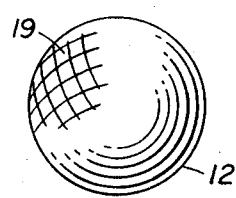
FIG. 6 is a view of the spherical fulcrum with a shaded area on the surface of the fulcrum to indicate that it may be coated with a friction providing or motion slowing surface.

Perhaps an alternative way of slowing the action would be to employ a sphere or ball 12 fabricated from a moderately hard rubber or a material which has only a slight amount of flexibility. Another way of slowing or controlling the action of the device described would be to provide a surface or coating of friction providing material 19 on the exterior of fulcrum ball 12 as shown in FIG. 6 and still another means of accomplishing the same slowing or control of the action would be to provide such a coating or surfacing of friction providing material 20 to the undersurface 16 of the concave center portion of said hat shaped balancing board 11 as shown in FIG. 3.

Figure 4:
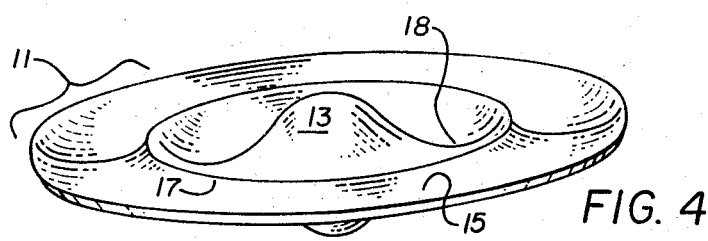
FIG. 4 is a perspective view of a further alternate version of the ball and hat balancing board provided with an intermediate foot trench for use by children.
Figure 5:
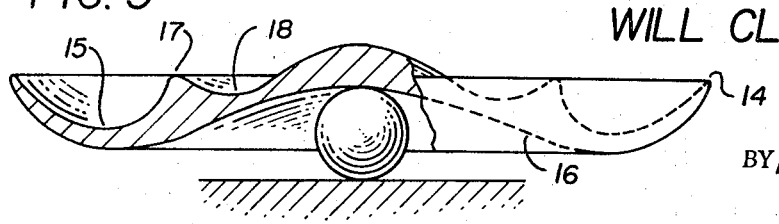
FIG. 5 is a horizontal cross section view of that form of the invention illustrated in FIG. 4.

In order to enable younger children to ride on the same balancing board as designed for teenagers and young adults the inventor suggests that the provision of an intermediate upturned circular brim 17 situated between the protuberant center crown portion 13 of said hat shaped balancing board 11 and the outer upturned brim 14 on the upper surface of hat shaped balancing board 11 to provide a secondary children's annular foot positioning trench 18 around and adjacent to the protuberant crown portion of said hat shaped balancing board 11 as illustrated in FIG. 4 and FIG. 5 of the drawings herein.

By examining the cross section view in FIG. 5 of the configuration of the children's modified version of hat shaped balancing board 11 note that the provision of a secondary foot positioning trench 18 on the upper surface of said balancing board need not affect the shape or operation of under bearing surface 16. A child stands in the same position illustrated in FIG. 1 except that he places his feet in the inner foot positioning trench 18 and uses shifts of position of his body weight to ride and balance the hat shaped balancing board.

In order for a person to ride the ball and hat embodiment of the invention described herein the rider assumes a position astride hat shaped balancing board 11 with his feet placed in opposite parts of foot positioning trench 15, then by shifting and achieving a proper distribution of his body weight the rider causes hat shaped balancing board 11 to become pivoted and balanced on top of spherically shaped fulcruming roller 12 without any part of the brim or circumference of said balancing board 11 being allowed to touch the floor or supporting surface. Thereafter the rider may by properly developed skillful patterns of shifting his body in various directions cause said hat shaped balancing board 11 to oscillate back and forth or to move in a variety of elliptical and orbital patterns in accordance with the experience and skill of the rider. Such manipulation and reciprocation of said balancing board can provide exercise and amusement to the rider operating the board and to observers watching the spectacle. The manner in which a child may ride on the special version of said hat shaped balancing board illustrated in FIG. 4 of the drawings herein has already been explained.

ADVANTAGES OF THE INVENTION

A material advantage of the invention is that it provides a balancing recreational device in which the rollable fulcrum is confined within a semi-enclosed cavity under the surface of the specially shaped balancing board in such manner that the rollable fulcrum is prevented from spinning out from underneath the balancing board with a violent spill for the rider.

A further advantage of the invention is that the balancing board recreational device contemplated by this invention will involve less danger of bodily injury to the users and riders of the device than were incurred by persons who rode previous versions of the flat board teeter-totter balancing board and log devices.

A still further advantage of the invention is that it provides a circular or hat shaped omni-directional balancing board that can be operated on a special spherically shaped fulcrum such that the specially shaped hat like balancing board can be moved and balanced in all directions while at the same time still limiting the violent extremes of motion.

Although this specification described but two embodiments of the invention with certain applications thereof, it should be understood that structural or material rearrangements of adequate or equivalent parts, substitutions of equivalent functional elements and other modifications in structure can be made and other applications devised without departing from the spirit and scope of my invention. I therefore desire that the description and drawings herein be regarded as only an illustration of my invention and that the invention be regarded as limited only as set forth in the following claims, or as required by the prior art.

Having thus described my Invention I claim:

1. An omni-directional ball and hat balancing device provided with non-linear stabilizing features comprising:
   A. a freely moving rigid fulcruming sphere adapted to roll across a horizontal surface;
   B. a rigid and generally circular hat shaped balancing board adapted to balance and ride on said fulcruming sphere, having
      1. a protuberant center portion resembling the crown of a hat and occupying about half to two thirds of the diameter of said hat shaped balancing board,
      2. an upturned periphery area at the outer circumference of said hat shaped balancing board resembling the brim of a Mexican sombrero hat and forming an annular foot positioning trench between the protuberant center portion and said upturned brim;
   C. the undersurface of said protuberant center crown portion of said hat shaped balancing board defining a long arc concave circular cavity, the sides of which gently slope away from the central apex of said concave enclosure to form a motion slowing surface.

2. An omni-directional ball and hat balancing device provided with non-linear stabilizing features comprising:
   A. a freely moving rigid fulcruming sphere adapted to roll across a horizontal surface;
   B. a rigid and generally circular hat shaped balancing board adapted to balance and ride on said fulcruming sphere, having
      1. a protuberant center portion resembling the crown of a hat and occupying about half to two thirds of the diameter of said said hat shaped balancing board,
      2. an upturned periphery area at the outer circumference of said hat shaped balancing board resembling the brim of a Mexican sombrero hat and forming an annular foot positioning trench between the protuberant center portion and said upturned brim;
   C. the undersurface of said protuberant center crown portion of said hat shaped balancing board defining a long arc concave circular cavity, the sides of which gently slope away from the central apex of said concave enclosure to form motion slowing surface; and
   D. a ratio of the radii of curvature of the concave undersurface of the center portion of said hat shaped balancing board having a range of four to one to ten to one times the radius of the sphere shaped fulcrum on which the balancing board rides.

3. The omni-directional ball and hat recreational balancing device with non-linear stabilizing features described in claim 1 with the concave undersurface of the protuberant center portion of said hat shaped board being surfaced with a coating of friction providing material to further slow the action of said hat shaped balancing board.

4. The omni-directional ball and hat recreational balancing device with non-linear stabilizing features described in claim 1 with the fulcruming sphere being provided with a surface coating of friction providing material to further slow and control the action of the balancing board.

5. An omni-directional ball and hat balancing device provided with non-linear stabilizing features comprising:
  A. a freely moving rigid fulcruming sphere adapted to roll across a horizontal surface;
  B. a rigid and generally circular hat shaped balancing board adapted to balance and ride on said fulcruming sphere, having
    1. a protuberant center portion resembling the crown of a hat and occupying about half to two thirds of the diameter of said hat shaped balancing board,
    2. an upturned periphery area at the outer circumference of said hat shaped balancing board resembling the brim of a Mexican sombrero hat and forming an annular foot positioning trench between the protuberant center portion and said upturned brim, and
    3. with an intermediate upturned circular brim situated between the protuberant center crown portion of said hat shaped balancing board and the outer upturned brim, forming a secondary children's annular foot positioning trench around and adjacent to said protuberant crown portion of said hat shaped balancing board; and
  C. the undersurface of said protuberant center crown portion of said hat shaped balancing board defining a long arc concave circular cavity, the sides of which gently slope away from the central apex of said concave enclosure to form motion slowing surface.

* * * * *